US012574118B2

(12) United States Patent
Mende et al.

(10) Patent No.: US 12,574,118 B2
(45) Date of Patent: Mar. 10, 2026

(54) TEMPERATURE-INDEPENDENT OPTICAL LINK

(71) Applicant: PMK Mess- und Kommunikationstechnik GmbH, Bad Soden am Taunus (DE)

(72) Inventors: Michael J Mende, Portland, OR (US); Mark Heimann, Bad Soden am Taunus (DE); Richard Booman, Lake Oswego, OR (US); Michael Engels, Krefeld (DE)

(73) Assignee: PMK Mess- und Kommunikationstechnik, GmbH (DE)

( * ) Notice: Subject to any disclaimer, the term of this patent is extended or adjusted under 35 U.S.C. 154(b) by 245 days.

(21) Appl. No.: 17/988,733

(22) Filed: Nov. 16, 2022

(65) Prior Publication Data

US 2023/0155679 A1 May 18, 2023

Related U.S. Application Data

(60) Provisional application No. 63/264,148, filed on Nov. 16, 2021.

(51) Int. Cl.
H04B 10/25 (2013.01)

(52) U.S. Cl.
CPC ................................... H04B 10/25 (2013.01)

(58) Field of Classification Search
CPC .... H04B 10/25; H04B 10/2507; G01K 13/00; G01R 31/2889; G02B 6/26
See application file for complete search history.

(56) References Cited

U.S. PATENT DOCUMENTS

| | | | | |
|---|---|---|---|---|
| 5,216,730 A | * | 6/1993 | Demeritt | G02B 6/4204 |
| | | | | 385/33 |
| 7,565,084 B1 | * | 7/2009 | Wach | H04J 14/04 |
| | | | | 398/201 |
| 9,712,900 B1 | * | 7/2017 | Wang | H04B 10/1129 |
| 10,897,119 B1 | * | 1/2021 | Kurczveil | H01S 5/021 |
| 12,136,950 B2 | * | 11/2024 | Gorzkiewicz | H04L 25/0296 |
| 2006/0133738 A1 | * | 6/2006 | Marcinkiewicz | H04M 1/0264 |
| | | | | 385/88 |
| 2006/0182449 A1 | * | 8/2006 | Iannelli | H04B 10/58 |
| | | | | 398/186 |
| 2007/0280695 A1 | * | 12/2007 | Li | H04J 14/0246 |
| | | | | 398/135 |
| 2009/0284749 A1 | * | 11/2009 | Johnson | A61B 5/0066 |
| | | | | 356/497 |
| 2011/0148682 A1 | * | 6/2011 | Rigby | H03M 1/188 |
| | | | | 341/155 |
| 2011/0164885 A1 | * | 7/2011 | Takei | H04B 10/503 |
| | | | | 398/192 |

(Continued)

*Primary Examiner* — Tanya T Motsinger
(74) *Attorney, Agent, or Firm* — Diana Mederos; Mederos Legal, PLLC

(57) ABSTRACT

A temperature-independent optical link for converting a received electrical signal to an analog signal. The temperature-independent optical link comprises a temperature-controlled transmitter chamber housing an ETO transmitter and a feedback-loop temperature control system. The optical link is housed in a probe head having a power supply device, and a probe tip. The temperature-independent optical link is used in a method for converting a received electrical signal to an analog signal.

10 Claims, 10 Drawing Sheets

(56) References Cited

U.S. PATENT DOCUMENTS

| | | | |
|---|---|---|---|
| 2015/0078760 A1* | 3/2015 | Kurashima | H04B 10/801 |
| | | | 398/139 |
| 2020/0406409 A1* | 12/2020 | Holme | B23K 26/705 |
| 2022/0117584 A1* | 4/2022 | Haider | A61B 8/445 |
| 2023/0066887 A1* | 3/2023 | Ichihashi | H05B 1/0202 |
| 2023/0155679 A1* | 5/2023 | Mende | G02B 6/26 |
| | | | 398/162 |
| 2024/0137675 A1* | 4/2024 | Chang | H04Q 11/0062 |
| 2024/0175719 A1* | 5/2024 | Mende | G02B 6/12 |
| 2024/0313804 A1* | 9/2024 | Zhang | H03M 13/3927 |
| 2024/0364426 A1* | 10/2024 | Stern | H04B 10/65 |

\* cited by examiner

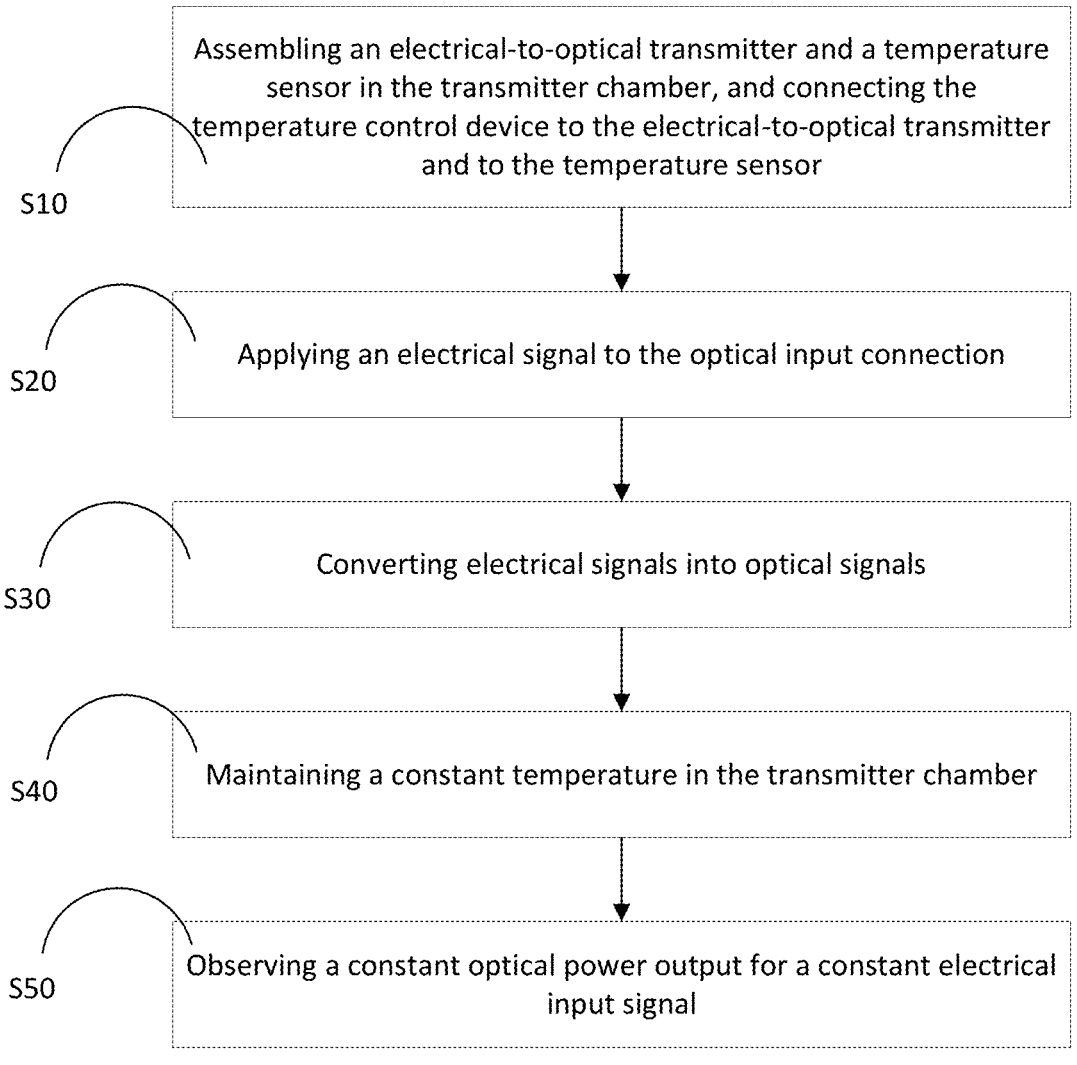

S10 — Assembling an electrical-to-optical transmitter and a temperature sensor in the transmitter chamber, and connecting the temperature control device to the electrical-to-optical transmitter and to the temperature sensor S20 — Applying an electrical signal to the optical input connection S30 — Converting electrical signals into optical signals S40 — Maintaining a constant temperature in the transmitter chamber S50 — Observing a constant optical power output for a constant electrical input signal

Fig. 9

S42 — retrieving a current temperature

S44 — retrieving a temperature deviation by comparing the retrieved current temperature to the set point temperature S46 — generating a temperature control output to compensate the temperature deviation

TEMPERATURE-INDEPENDENT OPTICAL LINK

CROSS REFERENCE TO RELATED APPLICATION

This application claims the benefit of provisional application No. 63/264,148 having a filing date of Nov. 16, 2021, and entitled, "Optical Link with Improved Optical Output Signal Control," the entire contents of which are incorporated by reference.

FIELD OF THE DISCLOSURE

The disclosure relates to electronics and semiconductor testing and measurement equipment and methods of use. More specifically, the present disclosure relates to a temperature-independent optical link for converting a received electrical signal to an analog signal. The optical link can be housed in a probe head used in electrical signal testing and measurement.

BACKGROUND OF THE DISCLOSURE

In the field of electronics and of semiconductor testing and measurement applications, optical links for analog signal transmission are used to convert locally acquired electrical measurement signal to a remote processing unit, such as an oscilloscope. The electrical signal is converted to an optical signal and sent to the recipient via a fiber optic cable. The acquired measurement signals may for example represent voltage measurements. Inherent to the vast majority of test and measurement applications is the requirement of transmitting signals at the highest possible quality. Nevertheless, with traditionally used equipment and methods, errors are introduced to the signal during its conversion and transmission.

Output signals of electrical-to-optical transmitters are susceptible to fluctuations when exposed to changing environment conditions. The wavelength generated by an internal optical diode of a laser is temperature sensitive.

Achieving stable and accurate analog transmissions across an optical link, such as a fiber optic link, has a unique set of challenges. Known approaches include digitizing the analog electrical input signal and transmitting the digitized signal over the optical fiber link digitally, applying FM. Other schemes include modulating the signal before transmitting. Other methods involve direct amplitude modulation of the signal and then attempting to compensate for signal variations, like the laser slope-efficiency, over time and temperature with variable gain amplifiers and offset tracking algorithms.

Digitizing analog signals and FM or other modulation schemes are typically limited by their inherent bandwidth consumption which is to the detriment of the bandwidth available for measurement data transmission. Applying direct amplitude modulation of the signal and then trying to compensate for the variations may allow utilizing the full bandwidth capability of the electrical-to-optical transmitter; however, the compensation of the temperature-dependent variations in an electrical-to-optical transmitter are not complete and result in some residual errors of the measured signal.

According to another traditional approach, temperature sensitivity of lasers is managed by controlling the laser output power by a laser internal photodiode. Such control approaches assume that the amount of light entering the optical fiber corresponds to the amount of light entering the photodiode. The difference between the light entering the internal photodiode and the light being coupled into the fiber is also called front-back tracking ratio, meaning the ratio of the two different outputs of the laser. This allows the implementation of suitable algorithms to adjust laser drive conditions based on the detected change in laser output power change, detected by the photodiode.

Beside the necessity of complex sensor and software infrastructure, this approach has the disadvantage that only a small fraction of the many effects temperature fluctuations may have on the optical link are considered by the control.

Another challenge known in the field of optical links is the tracking between the back facet monitor internal photodiode in the laser and the fiber output power, meaning the laser coupling into the output fiber, fiber output power level, over temperature. The back facet monitor, the internal monitor photodiode, is used to setting the laser output bias point for constant output power, maintaining a stable DC/LF laser output signal and for reducing LF noise through a feedback loop. If this tracking mismatch error becomes significant over temperature, the operating point of the laser diode will change due to incorrect readout in the control circuit. Additionally, the DC/LF and HF gain will deviate from each other, and the result is poorly compensated waveform, LF comp. One of the main contributors of this tracking/alignment error is the terminal expansion of the mechanical package which changes in temperature which introduces optical alignment/coupling errors inside the laser package.

SUMMARY OF THE DISCLOSURE

What is needed is an optical link providing a constant and clean optical output signal in a test and measurement application without being subjected to bandwidth losses due to error signal modulation. The temperature-independent optical link for converting a received signal to an analog signal, the probe head comprising such optical link, and the method for converting a received signal to an analog signal allow to reliably measure high quality signals in different and transient temperature environments.

In one embodiment, the temperature-independent optical link comprises a temperature-controlled transmitter chamber housing an electrical-to-optical transmitter, the transmitter being configured to convert an electrical signal received from an electrical input connection to an analog signal and to transmit the converted analog signal to an optical output connection. The temperature-independent optical link further comprises a feedback-loop temperature control system for controlling the transmitter chamber to a set point temperature using a temperature control device and a temperature sensor. The transmitter chamber is configured to maintain the electrical-to-optical transmitter at the set point temperature.

In one embodiment, the transmitter chamber is made of a material having a high thermal conductivity. The transmitter chamber is a tube made of metal such as brass, aluminum, copper, steel, or metal alloys. The optical link has a thermally and electrically insulating material around the transmitter chamber.

In another embodiment, the temperature control device is a Peltier device connected to the electrical-to-optical transmitter. The temperature sensor is arranged inside the transmitter chamber and is thermally connected to the ETO output transmitter. The electrical-to-optical transmitter comprises a fiber coupled laser package having a laser diode section and a laser alignment section. The temperature-independent optical link is configured for converting a received electrical signal of high frequency to an optical signal.

In one embodiment, the temperature-independent optical link is housed in a probe head having a probe tip and a power supply.

In yet another embodiment, the probe head comprises an input buffer connected to the probe tip and the electrical input connection of the electrical-to-optical transmitter.

In a further embodiment, the electrical-to-optical transmitter is connected to the input buffer via a thermal damping device.

One method for converting a received electrical signal to an analog signal with the temperature-independent optical link comprises the steps of assembling an electrical-to-optical transmitter and a temperature sensor in the transmitter chamber and connecting the temperature control device to the electrical-to-optical transmitter and to the temperature sensor, applying an electrical signal to an electrical input connection, converting electrical signals into optical signals, maintaining a constant temperature in the transmitter chamber, and observing a constant optical power output for a given electrical input signal.

BRIEF DESCRIPTION OF THE DRAWINGS

The accompanying drawings that are incorporated in and constitute a part of this specification illustrate several embodiments of the disclosure. Together with the description, they serve to explain the principles of the disclosure:

FIG. 9 illustrates an exemplary embodiment of a flow chart for controlling the electrical-to-optical transmitter using the optical link.

Figure 1:
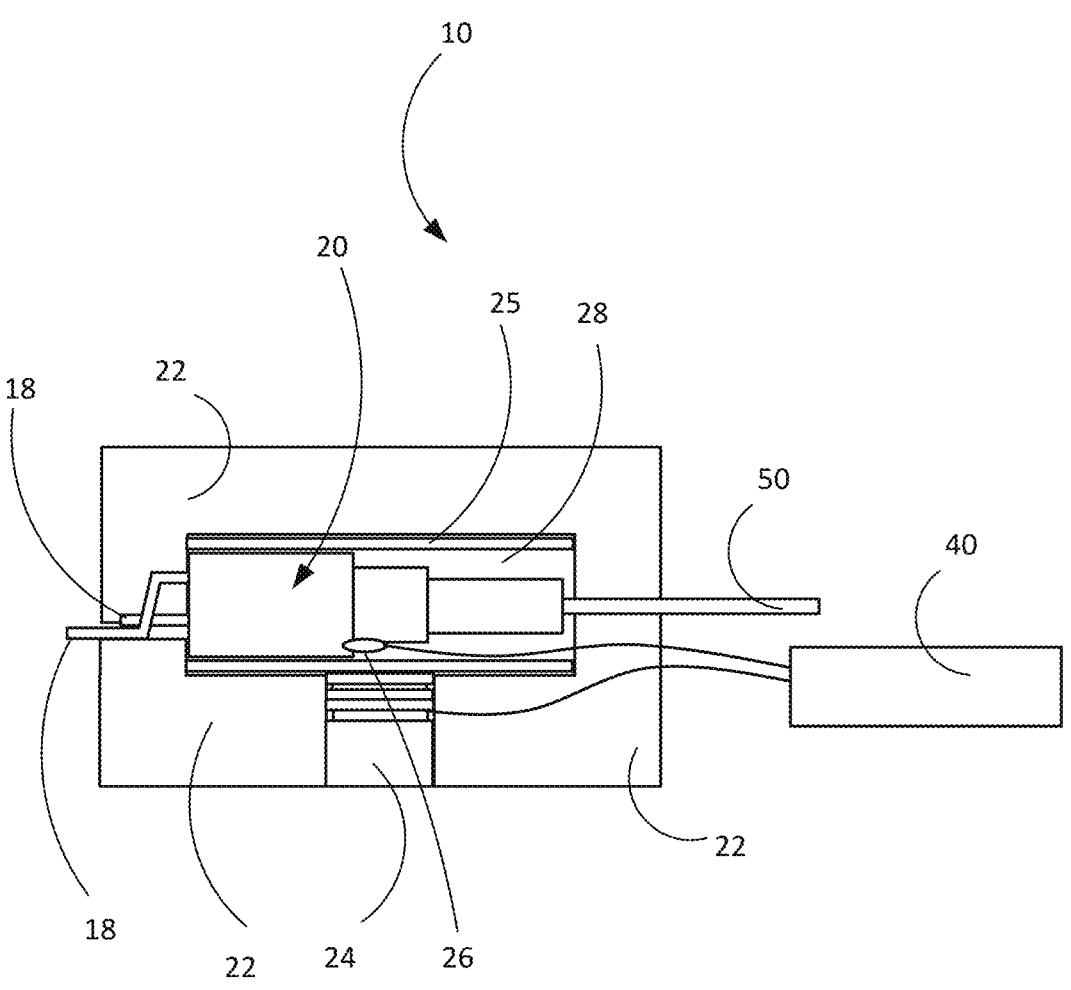
FIG. 1 illustrates a cross-section of an exemplary embodiment of an optical link in a side view.

REFERENCE NUMERALS OF THE FIGS.

10 Optical link
12 Electrical input
14 Housing
14A First half-shell of the housing
14B Second half-shell of the housing
16 Input buffer
17 Fastener
18 Electrical input connection
20 Electrical-to-optical transmitter ("ETO transmitter")
21 Laser diode section
22 Thermally and electrically insulating material

23 Laser alignment section
24 Temperature control device
25 Electrical-to-optical transmitter chamber
26 Temperature sensor
27 Fiber coupled laser package
28 Internal temperature controlled region
29 Header
30 Battery or power over fiber power converter
32 Screw-on cap
33 Thermal damping device
34 Laser diode
35 Hole in the thermal damping device
36 Laser beam
37 Lens
39 Glass capillary
40 Temperature control system
50 Optical output
52 Optical output connection
54 Bend limiter
100 Probe head
S10-S50 Method steps

DETAILED DESCRIPTION

The present disclosure provides generally for an optical link for converting a received electrical signal to an analog signal, comprising a temperature-controlled transmitter chamber housing an electrical-to-optical transmitter ("ETO transmitter"), the transmitter being configured to convert an electrical signal received from an electrical input connection to an analog signal and to transmit the converted analog signal to an optical output connection. An ETO transmitter may include a laser diode section and a laser alignment section. The temperature-independent optical link further comprises a feedback-loop temperature control system for controlling the transmitter chamber to a set point temperature using a temperature control device and a temperature sensor, wherein the transmitter chamber is configured to maintain the ETO transmitter at the set point temperature.

By providing a transmitter chamber comprising a temperature control device configured to keep the transmitter at a constant predetermined temperature, the entire ETO transmitter may be placed in an environment at constant temperature. In other words, the entire ETO transmitter may be shielded against temperature fluctuations by the transmitter chamber. This has the advantage that complex modulation, digitization, and front-back tracking ratio control approaches as previously discussed are rendered moot. This has the advantage that system complexity can be reduced significantly and bandwidth available for measurement data transmission can be maximized.

According to further embodiments, the optical link may further comprise a thermally and electrically insulating material around the transmitter chamber. The thermally and electrically insulating material may for example comprise expanded polystyrene, polyurethane (PU) foam, polyisocyanurate (PIR) foam, phenolic spray foam, or the like. Further, the temperature control device may comprise a temperature control system. Additionally, or alternatively, the temperature control device may comprise a Peltier device. Further, the temperature control device may comprise a temperature sensor, for example a thermistor or a thermocouple, and a temperature control system comprising a closed-loop or feedback-loop temperature control.

According to further embodiments, the ETO transmitter may comprise a fiber coupled laser package. The fiber coupled laser package may comprise, or consist of, a laser diode section and a laser alignment section. The laser diode section may comprise TO-can type package. The laser alignment section may comprise a sleeve, a glass capillary, and a proximal end of a fiber optic cable.

The coupled laser package may comprise a header, connecting the electrical input connection with the laser diode. The ETO transmitter may or may not comprise a cooled internal laser diode. The optical output connection may comprise a fiber optic cable and a bend limiter. The fiber optic cable may comprise a single mode fiber. Typically, the bend limiter and most of the fiber optic cable are not part of the ETO transmitter.

Using a temperature controlling device, such as a Peltier device (Thermo-Electric Cooler, TEC etc.), the ETO transmitter may be maintained at a constant temperature with a feedback-loop temperature control system.

External temperature fluctuations may influence the optical output signal to a great extent. As an example, a system having a front-back tracking ratio compensation, calibrated to 25° C., has been reported to have an error of 2% when operated at 27° C. In other words, this 2% error is attributed to the temperature expansion in the laser alignment section alone.

Since the entire ETO transmitter including the fiber alignment and coupling optics are inside the constant-temperature transmitter chamber, any temperature variations in performance can be greatly reduced or fully eliminated. By maintaining the ETO transmitter at a constant temperature, the threshold, $I_{th}$, and slope efficiency (mW/mA, SE), tracking error (BFM vs Pout) of the ETO transmitter (i.e. laser) will remain constant over the external operating temperature range of the system. The ETO transmitter chamber, or transmitter chamber, temperature set point can be adjusted as needed to minimize the power requirement of the temperature controlling device at normal external operating temperature conditions and to fine-tune laser parameters.

Apart from changes in the external temperature, the internal temperature of the ETO transmitter can change due to self-heating. This will cause a drift in laser parameters and likely results in erroneous measurement results especially directly after power up. Such a laser parameter drift is also avoided with the described invention.

Since the gain of this type of analog electrical-to-optical transmission system depends on the slope efficiency of the laser, an additional benefit of controlling the transmitter chamber temperature is that controlling the temperature of the laser enables the ability to change the slope efficiency and therefore to control the electrical-to-optical gain of the system. This allows the system gain to be adjusted as needed, for instance to compensate for gain changes in other parts of the system.

A particularly suitable way to maintain a constant temperature is to enclose the complete system including the ETO transmitter and the temperature sensor, or just the ETO transmitter in the thermally isolated transmitter chamber.

The ETO transmitter may be an element converting an electrical signal into an optical output signal. The ETO transmitter may for example comprise a laser.

The transmitter chamber, the ETO transmitter chamber, may comprise a material having a high thermal conductivity. Optionally, the transmitter chamber may comprise a material having a high thermal conductivity and a high heat capacity. The transmitter chamber may further comprise another material having a high heat capacity. The transmitter chamber may be a tube made of metal, for example brass, aluminum, copper, steel, or metal alloys. The transmitter chamber may also serve as the thermal interface to the temperature controlling device.

The temperature sensor may be used to measure the internal controlled temperature or the temperature of the ETO transmitter package. The temperature sensor may comprise a passive temperature sensor that requires an external power source, for example a thermistor. Alternatively, or additionally, the temperature sensor may comprise an active temperature sensor that does not require an external power source, for example a thermocouple, in particular a type K-thermocouple comprising nickel-chromium positive electrodes as temperature-sensing components.

A temperature controlling device may be, or may comprise, an element having the ability to heat, cool, or both heat and cool, depending on the temperature needs of the ETO transmitter and the overall system. This element may for example be a Peltier device (Thermo-Electric Cooler, TEC).

A thermally and electrically insulating material may be a material of low thermal conductivity and may be used as a cladding of the transmitter chamber to achieve maximum heat resistance to the outside environment. It may also insulate the transmitter chamber electrically. It may surround the transmitter chamber as best as the design allows. Providing such a thermal cladding of insulating material has the advantage that transient temperature gradients can be flattened, resulting in a more uniform temperature distribution.

A temperature control system may be an element forming the closed loop thermal feedback control system by monitoring the temperature sensor and controlling the temperature controlling device to maintain a constant internal controlled temperature. The control loop for the laser may be a temperature-based feedback loop.

The temperature control system may be configured such that external temperature fluctuations are compensated by controlling the transmitter chamber to a target temperature, the set point. In an ideal case, the temperature of the transmitter chamber is equal to the set point and has a uniform temperature distribution across the entire surface of the transmitter chamber. Consequently, the entire environment of the laser, at least the ETO transmitter arranged inside the transmitter chamber, also has a uniform temperature distribution.

The set point may be an external property, set by design, set by a technician, or set by a separate control system, or control loop. The temperature control system may further be configured such that the set point is adjustable, for example gradually, dynamically, or incrementally. For example, the temperature control system can be configured to adjust the set point by increments of 1 degree. With such a temperature control system, a constant slope efficiency, constant back-tracking, and a controlled gain can be achieved in the ETO transmitter.

By changing the set point, parameters of the laser can be fine-tuned. As an example, by increasing the set point in the temperature control system, a degraded slope efficiency of an older laser can be compensated.

An internal controlled temperature may be the controlled temperature inside the ETO transmitter chamber to maintain the ETO transmitter at a constant temperature.

An external environment temperature may be the outside temperature of the system that can fluctuate over time and that the system has no control over.

An ETO transmitter electrical connection, herein also referred to as electrical input connection, may comprise one or more electrical connections. These connections may include signal, bias, and monitoring connections. These connections may protrude past the insulating material into a zone subject to the external environment temperature. This end, these connections may have a small design and have a high thermal resistance to minimize the thermal path from the external environment temperature zone into the internal controlled temperature zone.

The optical output connection may be the optical output from the ETO transmitter element.

In the following sections, detailed descriptions of examples and methods of the disclosure will be given. The description of both preferred and alternative examples are exemplary only, and it is understood that to those skilled in the art that variations, modifications, and alterations may be apparent. It is therefore to be understood that the examples do not limit the broadness of the aspects of the underlying disclosure as defined by the claims.

DETAILED DESCRIPTIONS OF THE DRAWINGS

The adapter, also called probe head, is an active, compensated, single ended probe head suitable for high frequency electrical signal measurements and suitable for converting a received electrical signal to an analog signal. An electrical signal fed into a temperature-independent optical link embedded or housed in a probe head. The received electrical signal may for example be a high frequency electrical signal, for example having a frequency of 100 MHz or higher. High frequencies are greater than or equal to 100 MHz. It comprises the temperature-independent optical link according to the present disclosure and provides a constant and clean optical output signal in a test and measurement application without being subjected to bandwidth losses due to error signal modulation. Error signal modulation is the process of varying one or more properties of the error signal, which inherently leads to a higher bandwidth consumption. The higher the bandwidth needed for the error signal modulation, the lower the bandwidth available for the optical output signal. With the optical link according to the present disclosure, error signals can be drastically reduced by eliminating the error signal source, namely the temperature changes. Without an error signal, error signal modulation is moot, and the entire bandwidth is available for optical output signal transmission.

The conversion of a received electrical signal to an analog signal is agnostic of outside or inside temperature fluctuations. Hence, the conversion occurs at a constant temperature, which is the set point temperature. Accordingly, a user can utilize the exemplary probe head for various measurement applications under varying temperatures and at different measurement campaign intensities without observing temperature-change inflicted bandwidth losses.

Referring now to FIG. 1, an exemplary embodiment of a temperature-independent optical link is shown in a cross-section through the optical link along a side view.

Referring now to FIG. 1, a schematic of an exemplary optical link according to an embodiment of the present disclosure is illustrated. The optical link 10 comprises several ETO transmitter electrical connections, herein also referred to as electrical input connections 18, an optical output 50, or optical output connection, and an ETO transmitter 20. The optical link 10 further comprises an ETO transmitter chamber 25, or transmitter chamber. The transmitter chamber comprises a temperature control device 24 which is configured to keep the ETO transmitter 20 at a constant predetermined temperature. The transmitter chamber 25 may be a cylindrical tube which fully incorporates, or houses, the ETO transmitter 20 on its inside.

The transmitter chamber 25 may comprise a material having a high thermal conductivity. Examples of preferred conductivities include conductivity higher than 100 W/m-K, but preferably equal to or higher than the thermal conductivity of brass (111 W/m-K), more preferably aluminum (205 W/m-K), or even more preferably copper (385 W/m-K). The material may also have a high heat capacity, having a specific heat capacity equal to or greater than brass (0.92 kJ/kg*K). Alternatively, or additionally, the transmitter chamber 25 may comprise another material having a high heat capacity. The transmitter chamber 25 may be a cylindrical tube made of brass. The purpose of the transmitter chamber 25 is to maintain all its inside components at a uniform temperature, which is achieved by its high heat capacity and high thermal conductivity. The transmitter chamber 25 may be configured such that it has a uniform temperature over its entire length, its entire inner area, and all components inside the transmitter chamber 25. This keeps any heat-expansion-driven mechanical stress from the electrical-to-optical link 20 and allows uniform operation conditions for the ETO transmitter 20.

The dimensions and the material to be used depend on the situation and the kind of ETO transmitter 20 used and can be identified by simple, straightforward experiments.

The optical link 10 may further comprise a temperature control system 40 which may be connected to the temperature control device 24. The temperature control system 40 may comprise a feedback-loop temperature control. The temperature control system 40 may be an analog or digital control system.

The space between the ETO transmitter 20 and the transmitter chamber 25 is the internal temperature-controlled region 28. This internal temperature-controlled region 28 may have thermally insulating properties to minimize heat fluxes from or to the ETO transmitter 20 across the internal temperature controlled region 28. The internal temperature controlled region 28 may comprise air, a gas composition other than air, or even vacuum. According to an alternative embodiment, the internal temperature controlled region 28 may comprise a solid or a liquid.

The temperature control device 24 may have the ability to heat, cool, or both heat and cool the ETO transmitter 20, or to neither cool nor heat the ETO transmitter 20, depending on the control commands provided by the temperature control system 40. The temperature control device 24 may for example comprise, or be a part of a Peltier device, a Thermo-Electric Cooler, TEC. The temperature control device 24 may further comprise a temperature sensor 26.

The temperature sensor 26 may be a thermistor, or a thermocouple, suitable for measuring the internal controlled temperature or the temperature of the ETO transmitter 20. The temperature sensor 26 may be thermally connected to the ETO transmitter 20 in such a way that a surface temperature thereof can be measured. The temperature sensor 26 may also be arranged inside the transmitter chamber 25.

Figure 2:
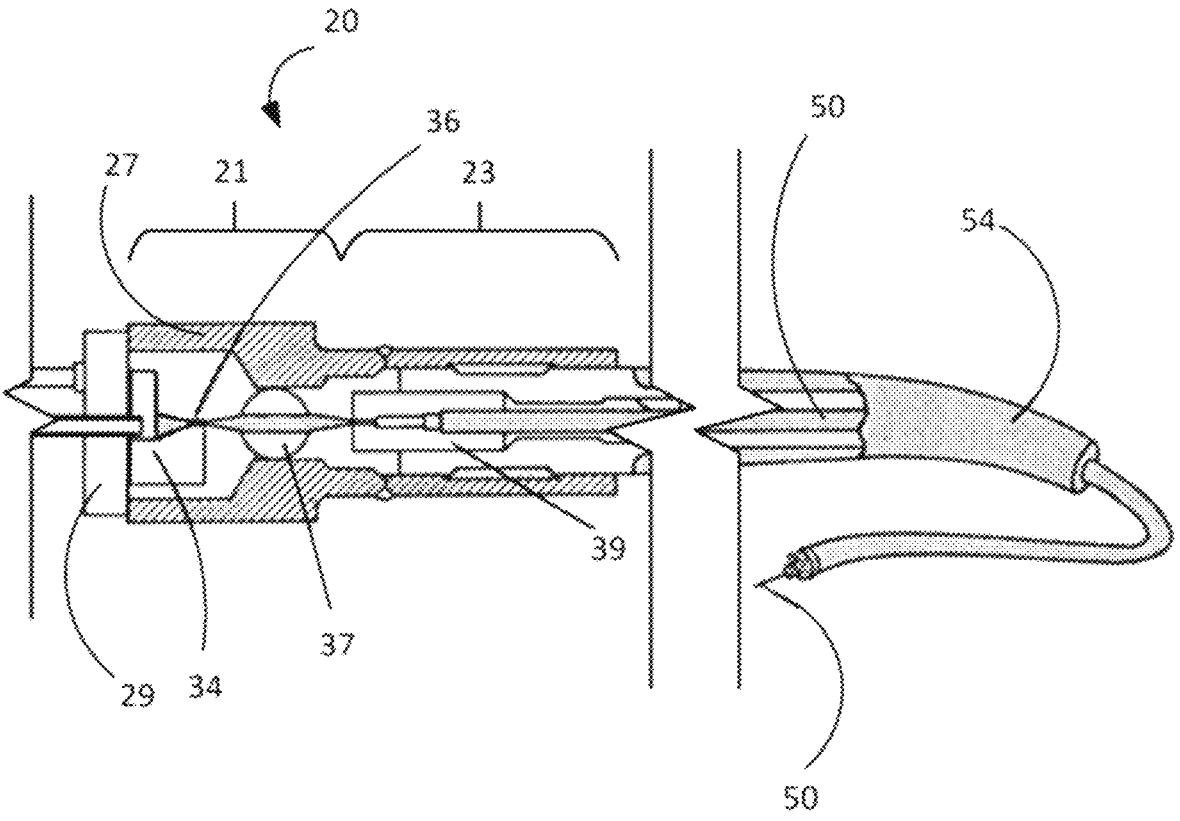
FIG. 2 illustrates a cross-section of an exemplary embodiment of an electrical-to-optical transmitter of the optical link.

The ETO transmitter 20 may comprise a fiber coupled laser package, comprising a laser diode section 21 and a laser alignment section 23 (see FIG. 2).

The optical link 10 may comprise thermally and electrically insulating material 22 around the ETO transmitter 20. The thermally and electrically insulating material 22 may be provided as a cladding of the ETO transmitter 20. The purpose of this insulating material is to achieve a maximum of thermal resistance. The thermally and electrically insulating material may comprise expanded polystyrene, polyurethane (PU) foam, polyisocyanurate (PIR) foam, or phenolic spray foam. The temperature zone outside the transmitter chamber 25 is hereinafter referred to as the external environment temperature zone.

The electrical input connection 18 may comprise several individual ETO transmitter electrical connections. These electrical input connections 18 may include signal, bias, and monitoring connections. These electrical input connection 18 may extend out of and past the thermally end electrically insulating material 22 into an external environment temperature zone. In order to minimize the thermal path created by the electrical input connection 18 extending through the thermally and electrically insulating material, the electrical input connections 18 may be designed small and with high thermal resistance.

The optical output connection, or optical output 50, as shown in the embodiment FIG. 1 may comprise a fiber optic cable, for example a single-mode fiber. The fiber optic cable may or may not be a cladded fiber-optic cable.

As can be seen from the illustration provided in FIG. 1, the ETO transmitter 20 comprises all components needed to convert electrical input signals into optical output signals. More specifically, only the electrical input connections 18 and the optical output connection 50 reach through the transmitter chamber 25 and the thermally and electrically insulating material 22.

Turning now to FIG. 2, an exemplary ETO transmitter 20 is shown in a cross-sectional view. The ETO transmitter 20 may comprise a fiber coupled laser package as it is known from the state-of-the-art. Such an ETO transmitter 20 may be compatible with the optical link 10 according to the present disclosure. On the left-hand side, the ETO transmitter comprises electrical input connections 18. On the right-hand side, the ETO transmitter 20 comprises an optical output connection 52. The ETO transmitter 20 may comprise a fiber coupled laser package 27. From left to right, the ETO transmitter 20 may comprise a header 29, which connects the electrical input connections 18 to a laser diode 34, the fiber coupled laser package 27 comprising a lens 37 receiving a laser beam 36 from the laser diode 34 and focusing the laser beam 3 onto a glass capillary 39, as well as a bend limiter 54 and a fiber optic cable as optical output connection 52.

The fiber coupled laser package 27 may comprise the laser diode section 21 and the laser alignment section 23. The laser diode section 21 and the laser alignment section 23 may be considered the essential parts of the ETO transmitter 20 which are to be placed inside the transmitter chamber 25 shown in FIG. 1. In other words, the laser diode section 21 and the laser alignment section 23 may be prone to cause fluctuations in the analog optical output signal when subjected to thermally induced expansion or contraction. Therefore, at least those components are to be placed inside of the transmitter chamber 25, which provides a constant-temperature environment.

Depending on their configuration, the header 29, the bend limiter 54 and the parts of the fiber optic cable 52 may also be considered parts prone to cause fluctuations in the analog optical output signal when subjected to thermally induced expansion or contraction. In a preferred embodiment, the header 29, the fiber optic cable 52 or the bend limiter 54 may also be part of the fiber coupled laser package 27.

The laser diode section 21 may comprise a back facet monitor internal photodiode in the laser. The laser beam 36 generated by the laser diode may be detected by the photodiode and is subsequently guided to a lens provided in a lensed capsule. Exiting the lens 37, the laser beam 36 is focused on a proximal end of a fiber optic cable provided in a glass capillary 39 which is held in place by the laser alignment section 23 provided in the form of a sleeve.

A change in temperature both from the outside or from the inside of the fiber coupled laser package 29 will lead to thermal expansion or contraction of the laser diode section 21 as well as the laser alignment section 23.

In general, any temperature change inflicted to the ETO transmitter 20 changes at least the distances between the individual components on the inside of the ETO transmitter 20 relative to each other. Consequently, the optics of the transmitter change, causing the output power of the transmitter to fluctuate accordingly. This is avoided by placing the ETO transmitter inside the transmitter chamber 25 which is configured to keep the ETO transmitter 20 at a constant predetermined temperature. Keeping the ETO transmitter 20 at a constant predetermined temperature has the benefit that thermal expansion is not observed in the ETO transmitter 20 regardless of the fluctuations of the internal or external temperature.

If for example the ETO transmitter 20 comprises a fiber optic laser package 27, at least of the laser diode section 21 and the laser alignment section 23 are such optical components which need to be placed within the transmitter chamber 25 to avoid analog optical output power fluctuations due to thermally induced expansion or contraction.

Figure 3:
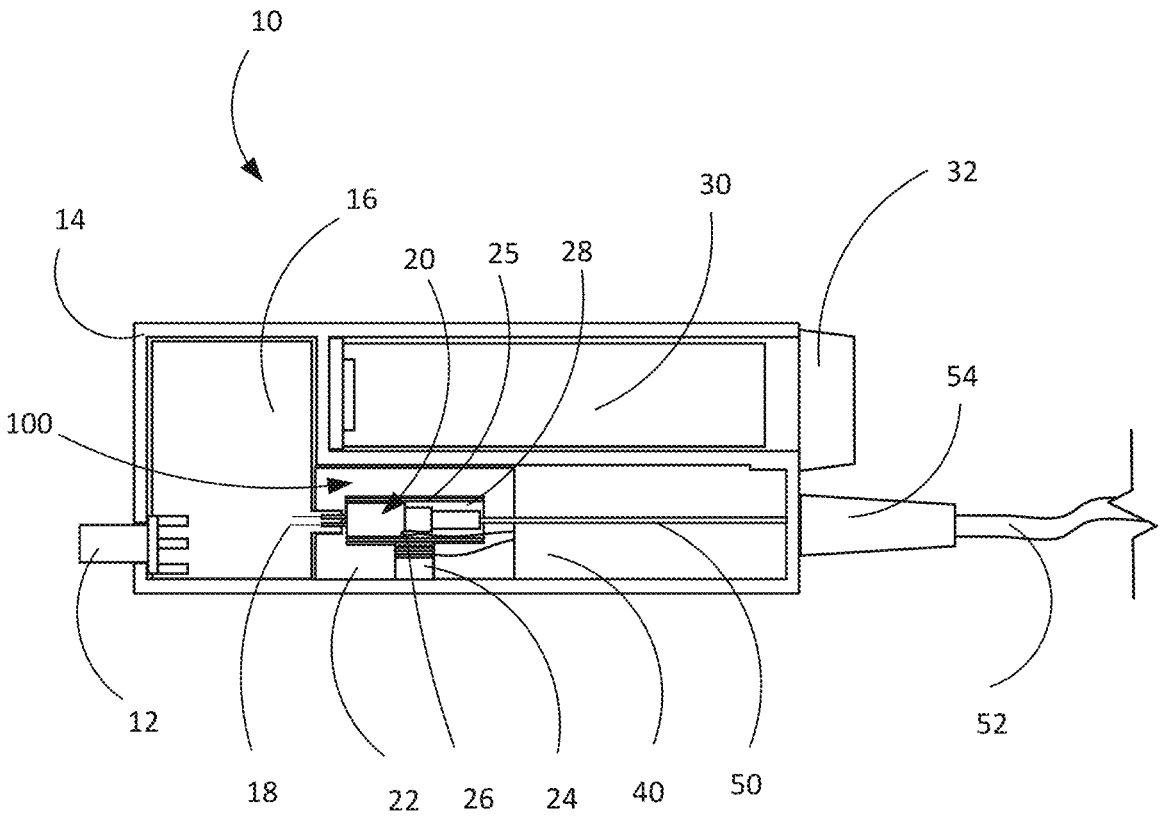
FIG. 3 illustrates a cross-section of an exemplary embodiment of probe head in a side view.

Referring now to FIG. 3, an exemplary embodiment of a probe head is shown in a cross-sectional view seen from the side. A probe head 100 may comprise a probe head tip 12 for electrical signal detection. The probe head tip 12 may be mounted to a housing 14 of the probe head. The housing 14 of the probe head 100 may comprise aluminum. The housing 14 may be a nickel-plated aluminum housing. The aluminum housing serves as heat sink to buffer transient temperature gradients between inside and outside of the housing. The housing 14 may further comprise a plastic covering for aesthetic purposes, but also for improved haptics and ergonomics, thermal, or electrical insulation of the housing 14.

On the inside of the housing 14, the probe head 100 may comprise an input buffer 16, for example a printed circuit board, PCB or PCBA, electrically connected to the probe tip 12. The probe head 10 may further comprise the optical link 10 shown in FIG. 1. Hence, the probe head 10 may comprise an ETO transmitter 20 which may be electrically connected to the input buffer 16 via an electrical input connection 18 on a proximal end of the ETO transmitter 20. The electrical-to-optical-transmitter 20 may be arranged on the inside of an electrical-to-optical-transmitter chamber 25.

The probe head 100 may further comprise a temperature control device 24 which is configured to keep the ETO transmitter at a constant predetermined temperature. The temperature control device 24 may be mounted to the inside of the housing 14 and may act as a support for the transmitter housing 25.

The probe head 100 may further comprise a battery or power over fiber power converter 30 which may be placed in a dedicated compartment of the housing 14. The probe head 10 may comprise a temperature control system 40 for the temperature control device 24. The temperature control system 40 may comprise components for supplying power for controlling the temperature control device 24.

The optical output 50 may be connected to a distal end of the ETO transmitter 20. The probe head 100 may further comprise an optical output connection 52 which may be connected to the outside of the housing 14 via a bend limiter 54. The optical output 50 may be guided on the inside of the optical output connection.

Figure 4:
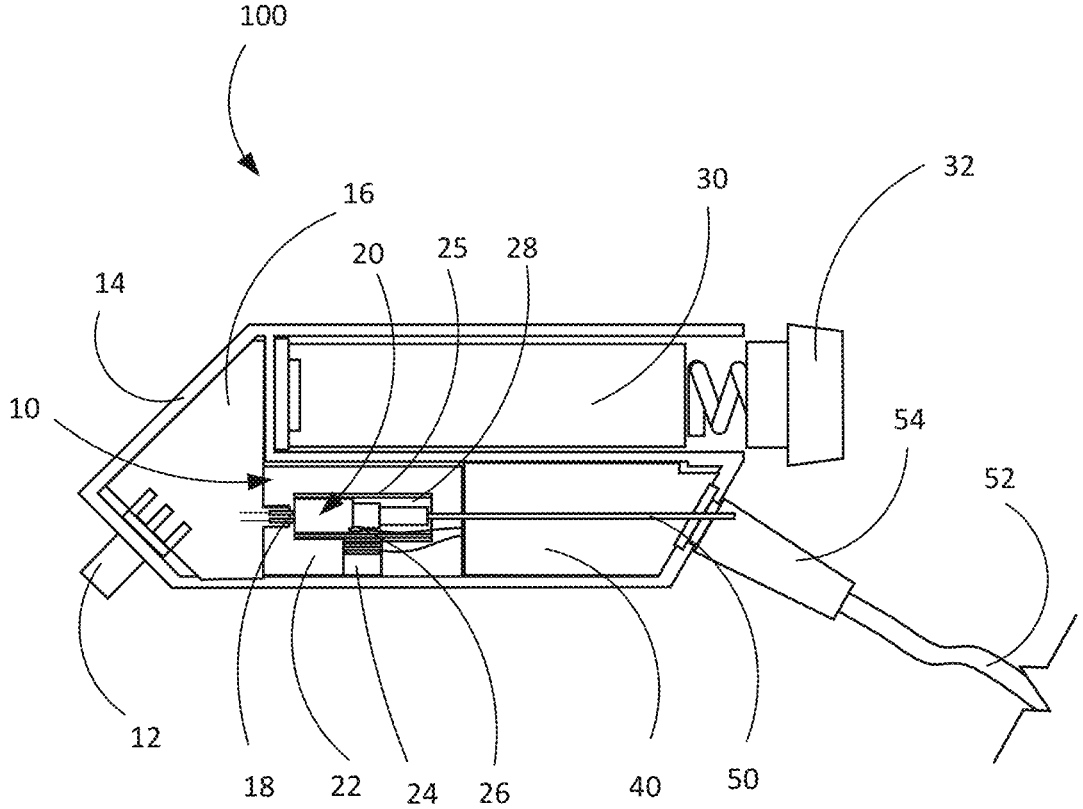
FIG. 4 illustrates a cross-section of an exemplary embodiment of probe head in a side view.

Turning now to FIG. 4, another exemplary embodiment of a probe head is shown in a cross-sectional view seen from the side. The embodiment shown in FIG. 4 differs from the embodiment shown in FIG. 3 in that the probe head 100 is an angled probe head. The housing 14 of the probe head 100 is configured such that the probe tip 12 and the optical output connection 52 are angled downwards. With an angled probe head 100, handing and measurements may be improved further due to reduced space requirements and the ability to use shorter probe tip cables at reduced bending. In the illustration of FIG. 4, the screw-on cap 32 is illustrated detached from the housing 14.

Figure 5:
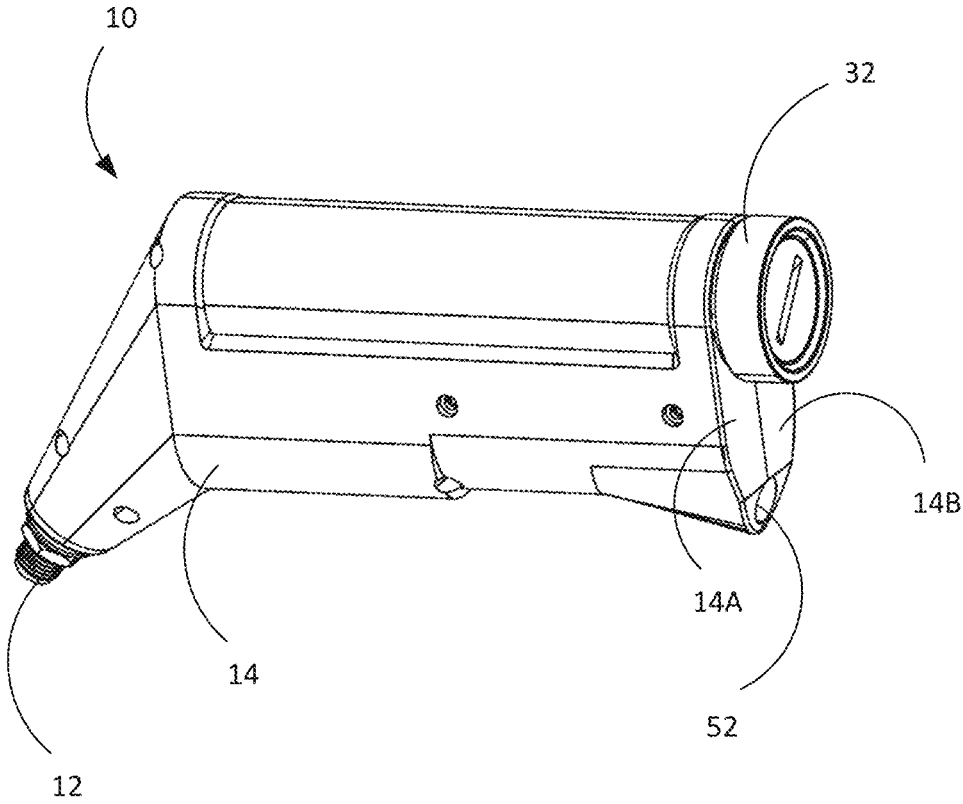
FIG. 5 illustrates a perspective view of an exemplary embodiment of a probe head.

Turning now to FIG. 5, an exemplary probe head is shown in a perspective view. The illustrated probe head 100 is based on the probe head schematically shown in FIG. 4. The probe head 100 is an angled probe head and is shown in an assembled state. The housing 14 may comprise two complementary half-shells 14A, 14B which may be held together by fastener 17. A fastener may be a screw, a nut and bolt, a pin, a nail, a male-female connector, or a snap. The screw-on cap 32 is shown in a screwed-on configuration.

Figure 6:
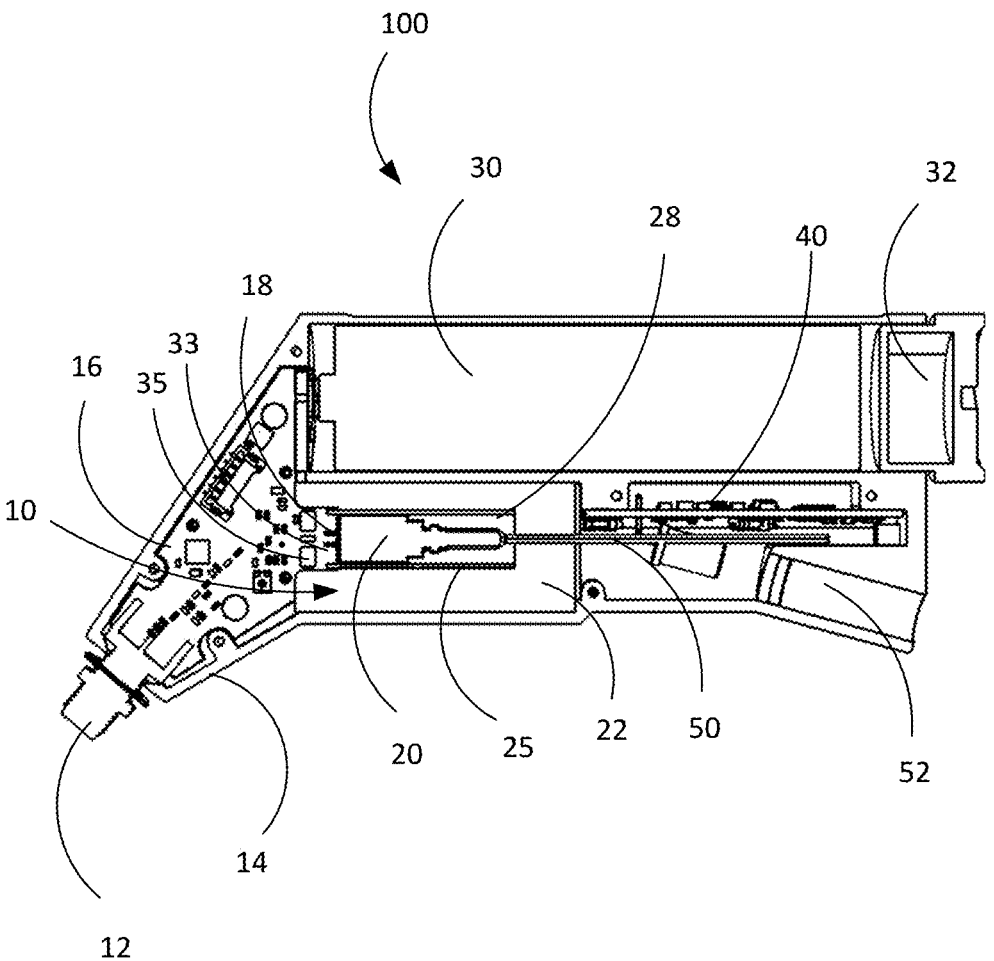
FIG. 6 illustrates a cross-sectional side view of the probe head of FIG. 5.

Turning now to FIG. 6, the probe head 10 of FIG. 5 is shown in a cross-sectional view seen from the side. The probe head 100 is based on the probe heads shown in FIGS. 3-5 and the optical link 10 disclosed in FIGS. 1-2. The same principles, definitions, and explanations provided in the context of FIGS. 1-5 also apply to the embodiment of FIG. 6 where applicable.

FIG. 6 shows how the ETO transmitter 20 of the optical link 10 may be fully incorporated into the transmitter chamber 25. The transmitter chamber 25 may be fully surrounded by the thermally and electrically insulating material 22. The temperature control device is not shown in FIG. 6 as it extends orthogonally to the depicted cross-section.

The transmitter chamber 25 may be thermally decoupled from the adjacent input buffer 16, for example by a gap, void, or empty space between transmitter chamber 25 and input buffer 16.

The probe head 100 may comprise a thermal damping device 33. The thermal damping device 33 may be a part of the input buffer 33 protruding towards the electrical input connection 18. The optical link 10 as disclosed in FIG. 1 is also shown in the cross-section. The ETO transmitter 20 of the optical link 10 may be electrically connected to the input buffer via the thermal damping device 33. The thermal damping device has low heat conducting properties to increase thermal isolation between the ETO transmitter 20 and the input buffer 16. For example, the thermal damping device 33 may comprise holes 35. As a result, heat conduction from the ETO transmitter 20 to the input buffer 16 is reduced. The thermal damping device 33 may further comprise or consist of a material having low thermal conductivity.

Figure 7:
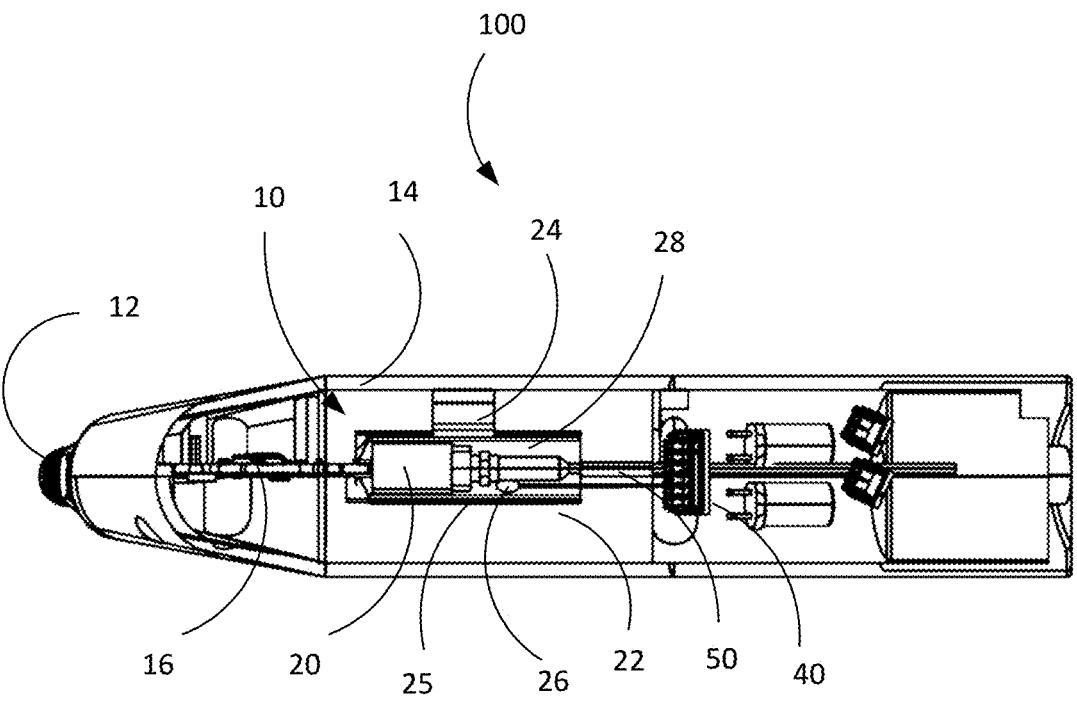
FIG. 7 illustrates a cross-sectional top view of the probe head of FIG. 5.

Turning now to FIG. 7, the probe head of FIG. 6 is shown in a cross-section seen from above. In this cross-section view, the temperature control device 24 may be seen. The optical link 10 as disclosed in FIG. 1 is also shown in the cross-section. The temperature control device 24 may extend from an inner surface of the housing 14 through the thermally and electrically insulating material 22 to the transmitter chamber 25. The thermally and electrically insulating material 22 covers the transmitter chamber 25 almost entirely and is interrupted only by the temperature control device 24 to the side, by the optical output 50 to the rear, and by the input buffer 16 to the front. It may also be seen from FIG. 7 that the temperature sensor 26 may be arranged on the inside of the transmitter chamber 25. The wires of the temperature sensor 26 may be wrapped around the temperature control device 24 and led to the temperature control system 50.

Figure 8:
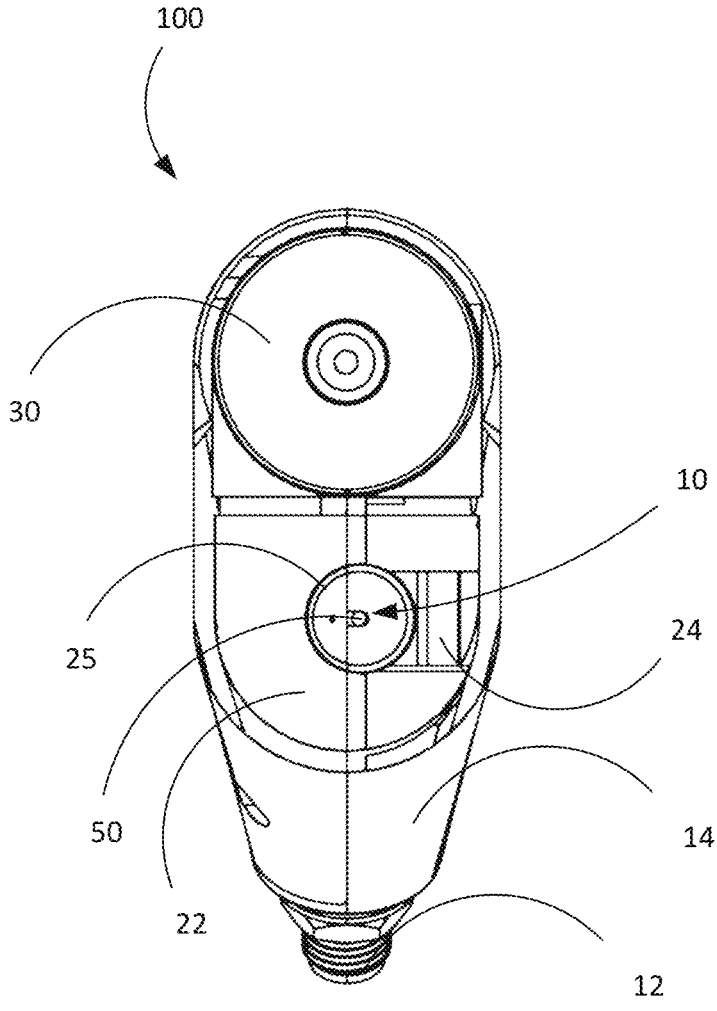
FIG. 8 illustrates a cross-sectional rear view of the probe head of FIG. 5.

Turning now to FIG. 8, the probe head of FIGS. 6 and 7 is now shown in a cross-section seen from behind. The optical link 10 as disclosed in FIG. 1 is also shown in the cross-section. The temperature control device 24 may extend from an inner surface of the housing 14 through the thermally and electrically insulating material 22 to the transmitter chamber 25.

Turning now to FIG. 9, a flow chart of an exemplary method for converting a received electrical signal to an analog signal with the temperature-independent optical link according to the present disclosure is shown. The method may be understood as a method for controlling the output power of an ETO transmitter. Alternatively, or additionally, the method may be suitable for converting a received electrical signal to an analog signal with probe head according to the present disclosure. The method may be suitable for controlling the output power of an ETO transmitter using a probe head according to the present disclosure.

The method may comprise the steps of assembling S10 an ETO transmitter and a temperature sensor in the transmitter chamber, and connecting the temperature control device to the ETO transmitter and to the temperature sensor, applying S20 an electrical signal to the output input connection, converting S30 electrical signals into optical output signals, maintaining S40 a constant temperature in the transmitter chamber, and observing S50 a constant optical power output for a given electrical input signal.

A given electrical input signal may be a constant electrical signal, for example a high frequency signal at a constant frequency, time period, and amplitude. What is meant is that the output optical power remains constant for the same electrical input signal, even if a temperature change outside the ETO transmitter occurs.

Figure 10:
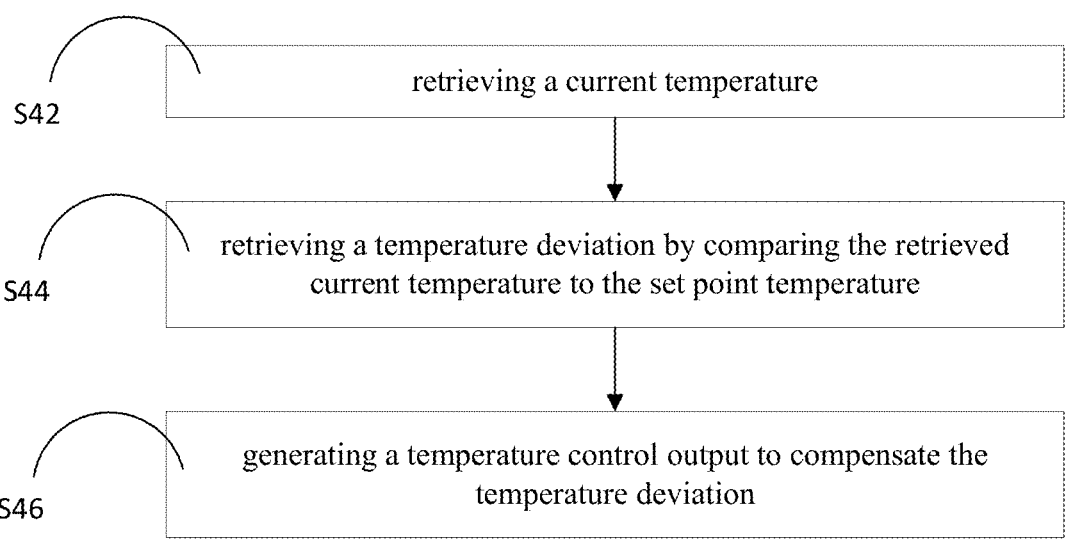
FIG. 10 illustrates an excerpt of another exemplary embodiment of a flow chart for controlling the electrical-to-optical transmitter using the optical link.

Turning now to FIG. 10, an excerpt of another exemplary embodiment of a flow chart for controlling the ETO transmitter using the optical link is illustrated. The shown excerpt illustrates sub steps of step S40 shown in FIG. 9. Hence, the step of maintaining S40 a constant temperature may comprise the sub steps of retrieving S42 a current temperature, retrieving S44 a temperature deviation by comparing the retrieved current temperature against a set point temperature, and generating S46 a temperature control output to compensate the temperature deviation. A closed-loop control may be established whereby no external inputs are needed to control the temperature to maintain a constant temperature in the transmitter chamber. The method steps may be repeated continuously, and additional signal filter steps may be implemented. The method may further comprise the steps of generating a laser beam and shooting the laser beam into an end of a fiber optic cable. The method may further comprise a step of electrical or optical signal modulation.

In preferred methods, the temperature sensor device provides the current temperature. The set point temperature is set by design, by a technician, or by an algorithm. Temperature deviation is determined by calculating the difference between the retrieved current temperature and the set point temperature. This may be achieved using the temperature control system, which may also generate the temperature control output to compensate the temperature deviation. The temperature control output is fed to the temperature control device.

Conclusion

A number of embodiments of the present disclosure have been described. While this specification contains many specific implementation details, these details should not be construed as limitations on the scope of any disclosures or of what may be claimed.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Thus, particular embodiments of the subject matter have been described. Other embodiments are within the scope of the following claims. In some cases, the actions recited in the claims can be performed in a different order and still achieve desirable results. It will be understood that various modifications may be made without departing from the spirit and scope of the claimed disclosure.

What is claimed is:

1. A temperature-independent optical link for converting a received electrical signal to an analog signal, the optical link comprising a temperature-controlled transmitter chamber housing an ETO transmitter, the transmitter being configured to convert an electrical signal received from an electrical input connection to an analog signal and to transmit the converted analog signal to an optical output connection,

a feedback-loop temperature control system for controlling the transmitter chamber at a set point temperature using a temperature control device and a temperature sensor, wherein the transmitter chamber maintains the ETO transmitter at the set point temperature, and whereby the optical link is housed in a probe head for converting a received electrical signal to an analog signal.

2. The optical link of claim 1, wherein the transmitter chamber is a tube made of a metal or a metal alloy of brass, aluminum, copper, or steel.

3. The optical link of claim 1, further comprising a thermally and electrically insulating material around the transmitter chamber.

4. The optical link of claim 3, wherein the thermally and electrically insulating material is selected from a group consisting of expanded polystyrene, polyurethane (PU) foam, polyisocyanurate (PIR) foam, phenolic spray foam, or combinations thereof.

5. The optical link of claim 1, wherein the temperature sensor is arranged inside the transmitter chamber and is thermally connected to an ETO transmitter.

6. The optical link of claim 1 wherein the probe head further comprises a power supply and a probe tip.

7. The optical link of claim 1, wherein the probe head further comprises an input buffer connected to the probe tip and an electrical input connection of the ETO transmitter.

8. The optical link of claim 7, whereby the ETO transmitter is connected to the input buffer via a thermal damping device.

9. A method of using the optical link of claim 1 the method steps comprising a. assembling the ETO transmitter and the temperature sensor in the transmitter chamber, b. connecting a temperature control device to the ETO transmitter and to a temperature sensor, c. transmitting an electrical signal to an optical input connection, d. converting electrical signals into optical signals, e. maintaining a constant temperature in the transmitter chamber, and f. observing a constant optical power output for a given electrical input signal.

10. The method steps of claim 9 further comprising determining temperature deviation by calculating the difference between a retrieved current temperature and a set point temperature.

* * * * *